C. A. AUSTIN.
MEANS FOR ATTACHING MIRRORS TO WINDOW PANES.
APPLICATION FILED OCT. 7, 1908.
918,724.
Patented Apr. 20, 1909.
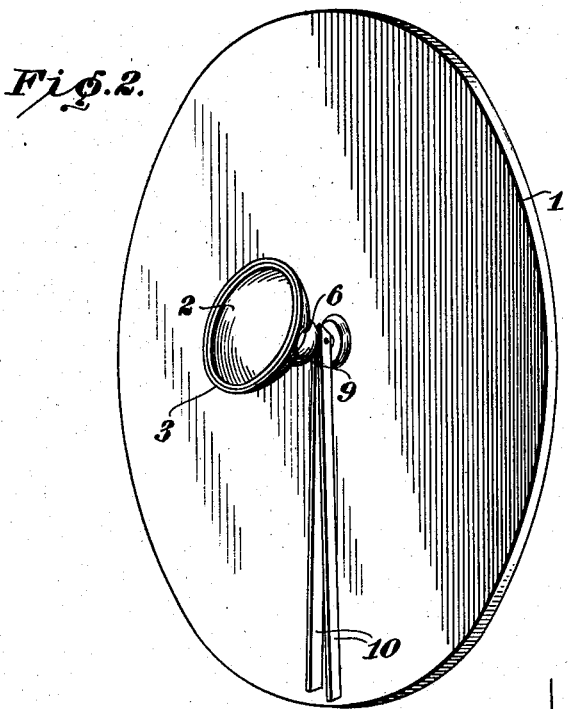
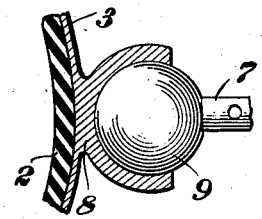
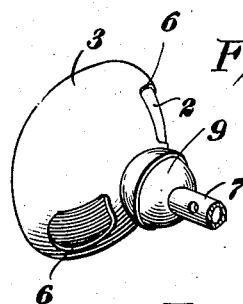
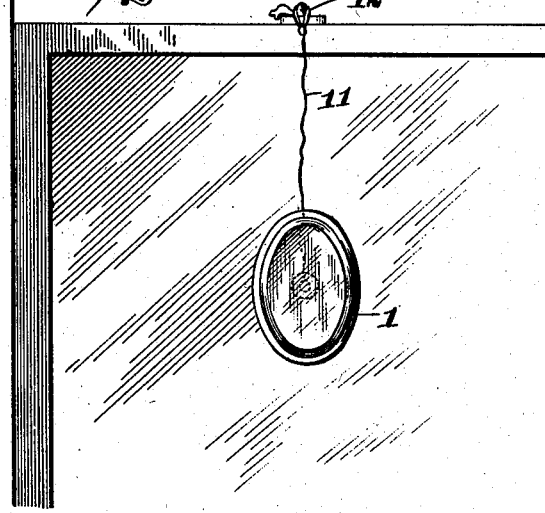
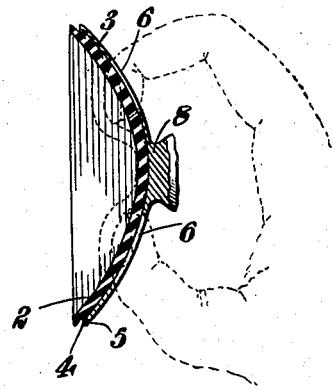
Inventor
C. A. Austin,
Witnesses
By
Attorneys

UNITED STATES PATENT OFFICE.

CHARLES A. AUSTIN, OF NEW YORK, N. Y.

MEANS FOR ATTACHING MIRRORS TO WINDOW-PANES.

No. 918,724.  Specification of Letters Patent.  Patented April 20, 1909.

Application filed October 7, 1908. Serial No. 456,621.

*To all whom it may concern:*

Be it known that I, CHARLES A. AUSTIN, citizen of the United States, residing in New York, in the county of New York and State of New York, have invented certain new and useful Improvements in Means for Attaching Mirrors to Window-Panes, of which the following is a specification.

When shaving it is desirable to locate the mirror so as to get the best light and have such light uniform or nearly so upon both sides of the face. These results are attained by locating the mirror at the window, but it is not always convenient or possible to support the mirror in the desired position.

The present invention supplies a mirror which may be attached direct to a window pane and adjusted to any angle, or which may be supported upon a table or stand.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a front view showing the application of the invention to a window. Fig. 2 is a perspective view of a mirror as seen from the rear, with the attachment applied. Fig. 3 is a detail view showing more particularly the ball and socket joint between the stems of the connecting means between the mirror and suction cup. Fig. 4 is a detail perspective view of the suction cup and connecting means. Fig. 5 is a sectional view of the suction cup and plate, the dotted lines showing the manner of compressing the suction cup preliminary to applying the same to a supporting surface.

Corresponding and like parts are referred to in the following description and indicated in all the views of the drawings by the same reference characters.

The mirror 1 may be of any construction, pattern or make. A suction cup 2 is provided as means for attaching the mirror to a window pane. A metal cup 3 forms a backing or protector for the suction cup and also provides convenient means for attaching the mirror supporting means to the suction cup.

The suction cup 2 may be of any size and outline and is provided near its outer edge with a rib, wale or like part 4 to make positive connection with the metal cup 3. The metal cup has an inner flange 5 preferably consisting of a recurved portion of the edge of the metal cup and this inner flange 5 receives the rib or wale 4 in a way to make a clencher connection between the two cups so as to prevent the casual disengagement of the metal cup from the suction cup, after the latter has been attached to the window pane. Openings 6 are formed in the metal cup 3 to receive the thumb and a finger of the hand when compressing the suction cup, preliminary to attaching the same to the window pane. The connecting means between the mirror and the suction cup comprise stems 7 and 8 and a ball and socket joint between said stems, such joint being of any desired construction so as to admit of the mirror being adjusted to any angular position to suit the convenience of the user. The stem 7 projects from the mirror and the stem 8 projects from the metal cup 3, both stems terminating in elements forming the ball and socket joint 9.

It is desirable at times to place the mirror upon a table, stand or other article of furniture and to properly support the same bars 10 are pivoted at their upper ends to the stem 7 and are adapted to fold against the mirror when the latter is suspended by means of the suction cup or when it is required to lay the mirror aside, thereby preventing said bars being in the way or occupying valuable space. When the mirror is supported in upright position, the bars 10 are spread at their lower ends, their upper ends being so constructed as to form stops and limit the spread of the bars at their lower ends, said bars in this position forming braces to hold the mirror in upright position after the manner of an easel attachment. To prevent injury to the mirror, should the suction cup slip or become detached, a cord or like connection 11 is attached at one end to the mirror, or to the stem 7 and is provided at its opposite end with a loop 12 or other attaching means to make connection with the window catch or stop applied to the meeting rail. In the event of the suction cup slipping, the mirror will be prevented from falling to the floor and breaking by the cord or like connection 11.

From the foregoing it will be understood that the invention provides simple, effective and positive means for attaching a mirror directly to the window pane, so that a maximum amount of light may be obtained when shaving, the mirror being so positioned as to enable a uniform light to be thrown upon both sides of the face. It is also noted that besides attaching the mirror directly to the window pane, it may be moved to any angular position, as may be required to meet various conditions during the process or operation of shaving.

The life of rubber is comparatively short, as is well known. The construction is such as to admit of the suction cup being readily replaced by a new one after it has lost its elasticity. The connection between the suction cup and the metal backing admits of the cup being removed by proper manipulation and replaced by a new one, the rib or wale being positively engaged with the recurved flange of the metal backing thereby forming positive connecting means between the suction cup and its backing, as will be readily understood.

Having thus described the invention, what is claimed as new is:

1. In a device of the character specified, the combination of a suction cup, a rigid cup fitted to the suction cup and having openings therein to admit of compressing the suction cup preliminary to applying it to the supporting surface, and article supporting means projected from the rigid cup.

2. In combination, a mirror, a stem projected therefrom, a rigid cup, a stem projected from the rigid cup, a ball and socket joint formed between the two stems and comprising coöperating elements attached to each, respectively, the rigid cup having an opening, and a suction cup fitted to the rigid cup and having a clencher connection therewith.

In testimony whereof I affix my signature in the presence of two witnesses.

CHARLES A. AUSTIN. [L. S.]

Witnesses:
WILLIAM D. HANBRIDGE,
ARTHUR H. COURAN.